Jan. 11, 1927.
H. H. WOLFF
1,613,973
VEHICLE OPERATED GARAGE DOOR
Filed April 9, 1925   3 Sheets-Sheet 1
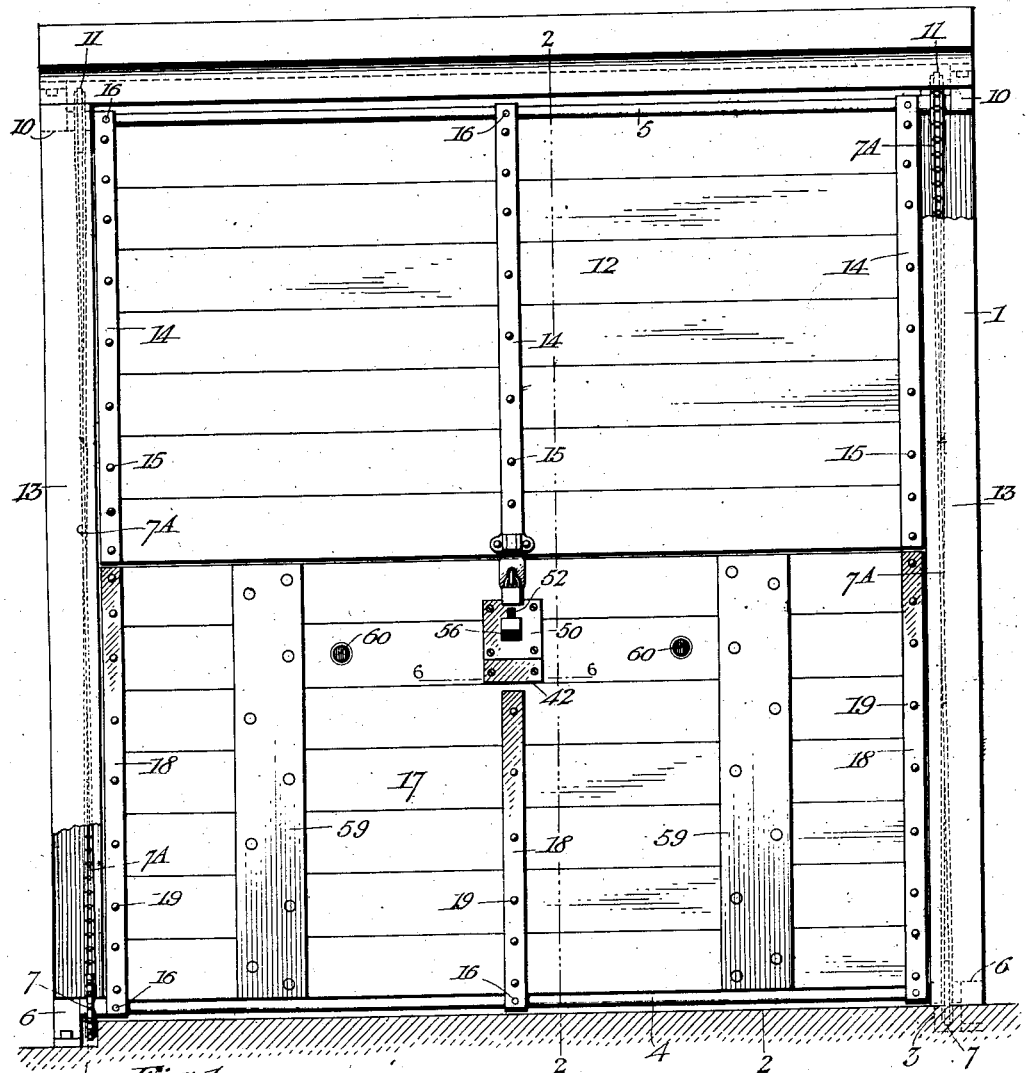
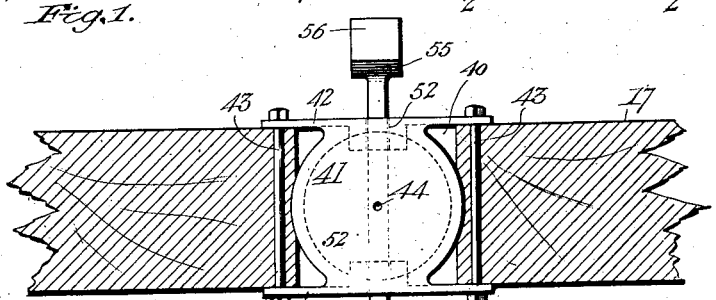
INVENTOR
Hans H. Wolff
BY
H. S. Bailey ATTORNEY

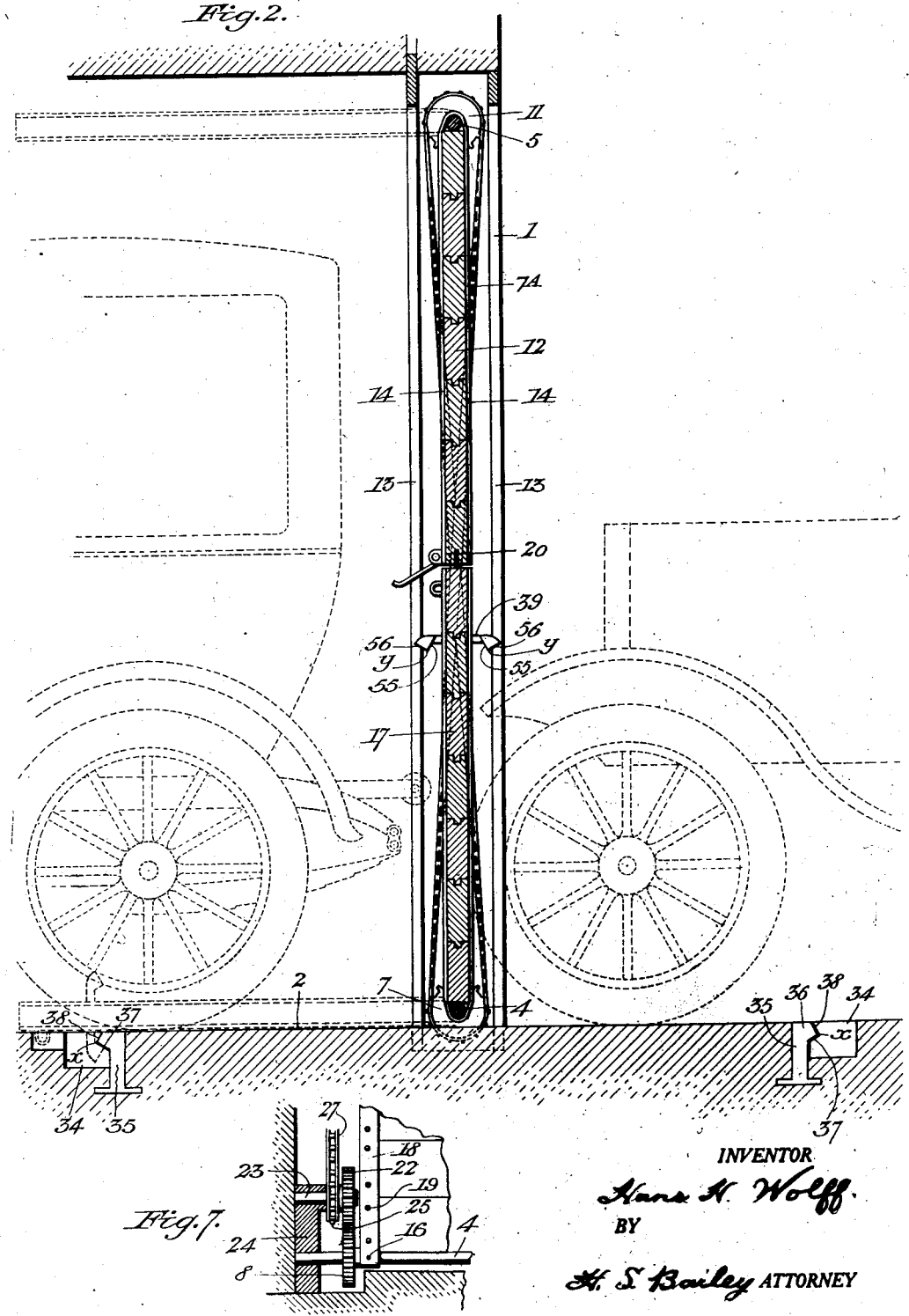

Jan. 11, 1927.
H. H. WOLFF
1,613,973
VEHICLE OPERATED GARAGE DOOR
Filed April 9, 1925   3 Sheets-Sheet 3
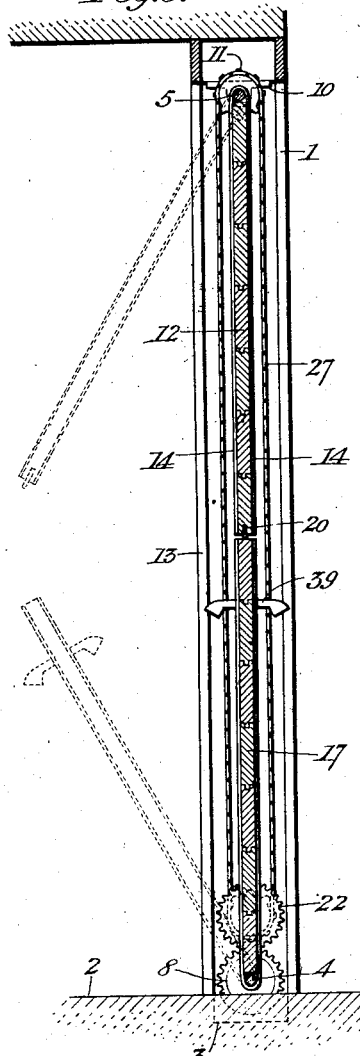
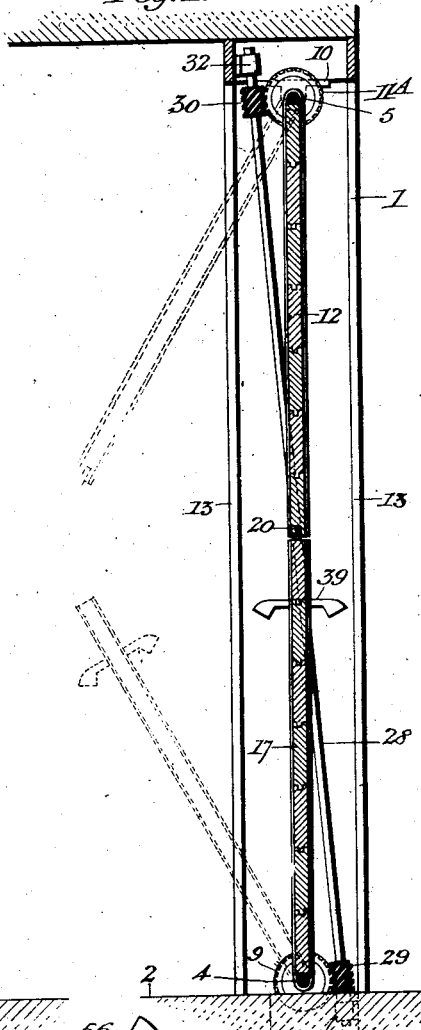
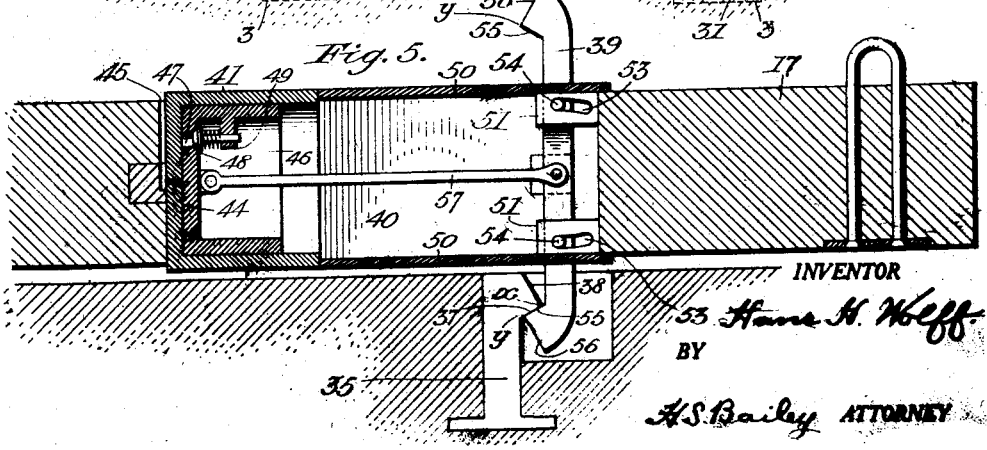
INVENTOR
Hans H. Wolff
BY
H. S. Bailey ATTORNEY Patented Jan. 11, 1927.

1,613,973

UNITED STATES PATENT OFFICE.

HANS H. WOLFF, OF DENVER, COLORADO.

VEHICLE-OPERATED GARAGE DOOR.

Application filed April 9, 1925. Serial No. 21,911.

My invention relates to a new vehicle operated garage door; and the objects of my invention are:

First: To provide a door for public and private garages that will open automatically to the direct pressure against it of a moving automobile.

Second: To provide a door for public and private garages that will automatically close itself after the automobile has opened it and passed by it.

Third: To provide a vertically positioned two part door for public and private garages, both parts of which are connected by mechanism and are arranged to swing in unison in the same direction; and to provide means by which the lower part door is adapted to be engaged by an automobile and swung down against the floor of the garage and locked there until the automobile runs over it, and that automatically unlocks itself after the car runs off it, and in which the upper part door is enough heavier than the lower part to raise the lower part door by suitable intermediate mechanism as it swings down into its normal vertically depending position.

I attain these objects by the mechanism illustrated in the accompanying drawings, in which:

Figure 1 is a front elevation of the two part automobile-opened door.

Figure 2 is a sectional elevation through the two part door on the line 2—2 of Figure 1.

Figure 3 is a vertical sectional view of a two part door showing a combined gear and sprocket wheel and chain mechanism whereby the lower part of the door acts to swing the upper part in unison with its swing movement when an automobile moves against it and swings it down against the floor.

Figure 4 is a vertical sectional view of a two part door showing a spiral gearing and shaft mechanism for operating the two parts of the door in unison with each other.

Figure 5 is an enlarged sectional view of a portion of the lower door as it rests upon the floor and is locked to the floor while the automobile runs over it.

Figure 6 is a sectional view of a portion of the lower door on the line 6—6 of Figure 1, showing the latching mechanism carried by the said door, including the hooks which are adapted to engage retaining members when the door is swung to a horizontal position by an automobile, and Figure 7 is a front view of one of the lower corner portions of the door and doorway shown in Figure 3.

Similar letters of reference refer to similar parts throughout the several views.

Referring to the drawings, the numeral 1 designates the doorway of a garage, and in this doorway I install an automobile-opened door that embodies my invention, and in the floor 2 of the garage at the opposite sides of the doorway are formed recesses 3. Across the floor in line with the doorway is placed a shaft 4, and across the upper end of the doorway is also placed a shaft 5. The shaft 4, is pivotally mounted at its opposite ends in bearings 6, positioned in the recesses 3, and these bearings are secured by bolts to the bottoms of the said recesses. The bearings 6 support the shaft 4 at a slight distance above the level of the floor and the opposite end portions of this shaft 4 have secured thereon sprocket wheels 7, as shown in Figure 1, or gear wheels 8, as shown in Figure 3, or worm wheels 9, as shown in Figure 4, as will be explained fully hereinafter.

The shaft 5, is also pivotally mounted in bearings 10, that are secured to the upper horizontal member of the doorway, the shaft being positioned a short distance below the said horizontal member, the opposite end portions of this shaft 5, having secured thereon either sprocket wheel 11, as shown in Figures 1, 2, and 3, or worm wheels 11$^A$, as shown in Figure 4.

On the upper shaft 5, a door 12, is secured, which is wide enough to swing freely between vertical boards or panels 13, on each side of the doorway, which serve to inclose the sprocket chains which operate the doors simultaneously, as will hereinafter be described. The door 12 is shown as being one half of the full length of the double door, but the upper door may extend down to any point between one half of the height of the doorway and a point corresponding to the height of the wheel hub of an automobile, and the lower door would, of course, be correspondingly shorter. The upper door 12, is secured to the shaft 5, by straps 14, that are secured to the door by bolts 15, the straps being bent or looped around the shaft and are rigidly secured to it, preferably by pins 16, which are passed through the looped ends of the straps and through the shaft, as shown.

As the door 12 is secured to the upper shaft 5, it will swing upwardly in either direction into a horizontal position.

The lower shaft 4, also has a part door 17, secured to it by straps 18, that are secured to it by bolts 19, and the straps are bent or looped around the shaft 4 and are rigidly secured to it by pins 16, as in the case of the straps 14.

This lower part door 17 extends up to within a slight distance of the lower edge of the upper door 12, and both of the doors are positioned in the same vertical plane and therefore have the appearance of a single door. A rubber strip 20, is secured in a groove in the lower edge of the upper door, and extends a slight distance below the edge of the door, and when the doors are in closed position, this strip 20, will engage the upper edge of the lower door and close the space between the two doors.

It is necessary that these two part doors swing inwardly and outwardly in the same direction and in unison when the lower door is opened in either direction, in response to the pressure of either the front end, or the rear end of an automobile against it, as will be presently explained, and this is accomplished in the following manner: Upon the opposite ends of the shafts 4, as shown in Figure 3, are secured gears 8, and meshing with each of these gears 8, is a gear 22, of the same size as the gear 8, and is placed directly above it. The gears 22 are mounted on stub shafts 23, which are supported in bearing brackets 24, that form a part of the bearing 6 of the shaft 4, and on each stub shaft 23 at the side of the gears 22, is secured a sprocket wheel 25, and on the opposite ends of the shaft 5 are secured sprocket wheels 11, and each opposite pair of sprocket wheels 11 and 25 on the opposite ends of the shaft 5, and the stub shafts 23, respectively, are connected by sprocket chains 27.

When an automobile entering the garage runs slowly up against the lower door 17, it is moved to swing inwardly and downwardly until it lies flat down against the floor, and this swinging and turning movement of the shaft turns the gears 22, on the stub shafts 23, the sprocket wheels 25 turn the sprocket chains 27, and they turn the sprocket wheels 11, which are secured to the shaft 5, in the direction to swing the upper door inwardly and upwardly until it stands in a substantially horizontal position, under the ceiling of the garage.

My invention, however, contemplates any mechanism for swinging these two part doors in unison and in the same direction, and in addition to the gear and sprocket wheel and chain mechanism above described, I illustrate modified type of operating mechanism shown in Figure 4, and which is constructed as follows:

On each side of the doorway is mounted a shaft 28, which is at an inclination to a vertical line, the upper ends of these shafts being slightly in front of the upper end of the upper door, their lower ends being slightly in rear of the lower ends of the lower door, as shown, and on the opposite ends of these shafts 28, are secured spiral tooth pinions 29 and 30, and on the opposite ends of the shafts 4 and 5, are secured spiral tooth gears 9 and 11$^A$, respectively, and the shaft 28 is inclined enough to the vertical plane of the shafts 4 and 5, to allow the spiral toothed pinions to mesh with the spiral toothed gears, and the opposite ends of the shaft 28 are journaled in bearings 31 and 32, that are secured in the recesses 3 in the floor and at the upper ends of the door jambs.

The spiral teeth of the spiral pinions and of the spiral gears are made to stand at right angles to each other, and consequently, as the lower door swings down, its spiral gears 9 will turn the spiral toothed pinions 29, and consequently the shafts 28 rotate the upper spiral pinions 30 and they rotate the spiral toothed gears 11$^A$ on the ends of the upper shaft 5 in the opposite direction from the shaft 4, and therefore the upper door will be swung in the same direction and in unison with the lower door.

In Figures 1 and 2, the sprocket wheels 7 on the lower shaft 4, and the sprocket wheels 11 on the upper shaft 5, are connected respectively by crossed sprocket chains 7$^A$, by which rotation of the lower sprocket wheels 7, in either direction, imparts an opposite rotation to the sprocket wheels 11 on the shaft 5; and therefore, when the lower door is swung either inward or outward, the upper door will be swung in a corresponding direction.

It is essential to the successful operation of my vehicle-operated opening and closing two-part garage door that mechanism be provided for holding them in a horizontal position for a short period after they have been swung to such positions by an automobile in either entering or leaving the garage, in order that the automobile may be entirely beyond the path described by the doors, before they start to swing to vertical positions when an automobile has pushed against them, and while the invention contemplates any way of accomplishing this, I preferably employ the following mechanism.

The floor of the garage, and also the driveway leading to the garage, are provided, respectively, with recesses 34, which are at equal distances from the shaft 4, and in line with the center of said shaft. In the bottoms of these recesses are secured the base portions of anchors 35 in the form of vertical posts, which terminate at their upper ends in lateral catch lugs 36, the tops of which are flush with the floor line of the garage.

Catch lugs 36 are each formed with inclined faces 37 and 38, the face 37 being at an angle of approximately 30 degrees to the horizontal, and the face 38 being at right angles to the face 37, as clearly shown in Figure 2. The faces 37 of the catches are adapted to engage correspondingly inclined faces on a latch bar 39 (see Figure 5) that is mounted in the lower door, as will be presently explained. The inclined faces 37 and 38 of each catch lug converge to a point "X" and these points on the two anchors face in opposite directions, as shown in Figure 2.

The latch bar 39, and parts connected therewith, are arranged as follows: An opening 40 is formed through the lower door, near the upper end thereof and centrally of its width, and in the lower end of this opening is secured a cylinder 41. The cylinder is formed on opposite sides with projecting wings 42, which overlap the sides of the opening 40 so as to engage the opposite sides of the door, and bolts 43 are passed through the ends of the wings and through the door, as shown in Figure 6, thereby securing the cylinder within the opening 40. The cylinder head is provided with a small axial hole 44, which connects with an air passage 45 in the door. Within the cylinder is mounted a cup-like piston 46, having a relatively large air port 47, which is normally closed by a spring controlled valve 48 having a stem which is slidably mounted in a hole formed in a lug 49 which projects inward from the wall of the piston, the spring being interposed between the valve and the said lug 49, and surrounding the valve stem, as shown. The remaining part of the opening is covered by plates 50, which are bolted to opposite sides of the door, and each of these plates 50 is formed with an inwardly projecting lug 51 through which is formed a guide slot 52, and opposite slots 53, which extend through the wall of the lug from the guide slot, as will be understood by reference to Figures 5 and 6. The guide slots 52 are alined, and in these slots is mounted the latch bar 39, which is held in position by fulcrum pins 54, which extend through the slots 53 and through the said latch bar. Each pair of slots 53 are arcs, whose centers coincide with the center of the fulcrum pin which passes through the other pair of slots 53, the latch bar being in normal position. The opposite ends of the latch bar extend beyond the opposite sides of the door and these ends are in the form, substantially, of hooks, which are in the form of lateral projections having inclined faces 55 and 56, which converge to a point "Y", the faces 55 being of a corresponding angle to the faces 37 of the anchors 35, when the door is in a horizontal position, and the faces 56 being of a corresponding angle to the faces 38 of the anchors, when the door is in a horizontal position.

A piston rod 57 is pivotally connected at one end to the piston 46, and at the other end to the latch bar 39, centrally of its length. The latch bar is at a distance from the lower shaft 4 corresponding to the distance of either anchor post 35 from the said shaft, so when the lower door swings in either direction one end of said latch bar will engage the adjacent anchor, as will be understood.

In operation, as a car, either on the inside or outside of the garage, approaches the door, the lower part of the said door is engaged by the wheels of the car, or by a bumper on the car, or, if the car is backing, by a projecting element on the car, as shown in dotted lines, Figure 2, and the door is gradually swung down to a horizontal position, the upper part of the door being simultaneously swung up to a corresponding position by the mechanism previously described. As it approaches such position, the inclined face 56 of one end of the latch bar 39 engages the correspondingly inclined face 38 of the adjacent anchor 35, and the latch bar is suddenly swung outward, the fulcrum pin 54 farthest from the contacting end of the latch bar acting as the pivot on which the said bar swings. This sudden swing of the latch bar exerts a pull on the piston rod 57 and a corresponding movement of the piston 46 in the cylinder 41, and the sudden movement of the piston creates a vacuum between the cylinder and piston heads, as the hole 44 in the cylinder head is so small that air cannot be instantly drawn into the cylinder by the movement of the piston. As the point "Y" on the latch head passes the point "X" on the anchor post 35, the vacuum between the cylinder and piston heads instantly draws the latch bar inward, and the inclined face 55 of its hook end slides beneath the inclined face 37 of the anchor, and the doors are thereby held in horizontal positions for a period of sufficient length to permit the car to pass over the lower door and beyond the path in which the two doors swing. But as the upper door is heavier than the lower door, it begins to move down by gravity the instant the car clears the lower door, and its movement, acting through the sprocket and chain mechanism, exerts an upward pull on the lower door, tending to release the latch from the anchor 35. However the latch cannot escape from the anchor due to the suction created behind the piston as it attempts to move. This suction or partial vacuum can only be overcome by the entrance of air through the passage 45 in the door, and the hole 44 in the cylinder head, and as the hole 44 is very small, the outward movement of the latch bar is retarded sufficiently to permit the car to clear the path of the doors, as previously stated. When the lower door reaches a vertical position, the weight of the piston causes it to drop by gravity and the air between the piston head and the cylinder head escapes through the air port 47, by lifting the valve 48, which normally closes said port, and the piston head again rests upon the head of the cylinder.

Track plates 59 (see Fig. 1) are secured to opposite sides of the lower door, and these act in conjunction with the straps 18 to strengthen the door. The lower door is also provided on opposite sides with resilient bumpers 60, preferably rubber, which cushion the door as it is swung to a horizontal position by the car.

As before stated, it is not necessary that the two parts of the door should be of the same width, but the lower door may extend only as high as the centers of the car wheels, or any height from that point to a point equal to one half of the full height of the two-part door, and the upper door will have a correspondingly greater length than the lower door when the latter door is less than one half of the full height of the double door.

Having described my invention, what I claim as new and desire to secure by Letters Patent is:

1. An automobile operated garage door divided intermediate of the height of the doorway, horizontal shafts secured to the door parts, which extend across the doorway, means connecting the shafts at their ends whereby, when the lower door swings downward the upper door is thereby swung upward, a cylinder in the lower door part, a piston therein, a latch connected to said piston, and catches in the driveway on opposite sides of the lower door for engaging the latch and locking the lower door part against the driveway until after the automobile has passed over it.

2. In an automobile operated garage door, the combination with a doorway frame, of a two-part door therein, the upper part being hinged at its upper end to the upper part of the doorway frame, and the lower part being hinged at its lower end to the lower part of said frame, and means connecting the hinge elements of said doors whereby, when the lower door is swung downward, the upper door is at the same time swung upward and means for holding the lower door temporarily in a horizontal position after an automobile has passed over the same.

3. In a two part automobile operated door for garage doorways, the combination with shafts rotatably mounted at the upper and lower ends of said doorway, of doors rigidly connected to said shafts, the upper door being the heavier, and means connecting said shafts whereby when the lower door is swung down, the upper door is swung up simultaneously therewith and means including an automatically operating latch for temporarily holding the lower door against the driveway after an automobile has passed over said lower door.

4. In a two part automobile operated door for garage doorways, the combination with shafts rotatably mounted respectively at the upper and lower ends of said doorway, of doors rigidly secured to said shafts, and a chain and sprocket connection between said shafts, whereby when one of said doors is swung either inward or outward, the other door is swung simultaneously therewith, said lower door being adapted to swing down against the driveway by the engagement therewith of a moving car; catches on each side of said door in the driveway, and a latch on said door adapted to be engaged by either one of said catches, and means for automatically releasing said latch in a short period after an automobile has passed over said lower door.

5. The combination with a doorway frame, shafts rotatably mounted, respectively, in the upper and lower ends of said frame doors rigidly connected to said shafts and meeting at an intermediate point between said shafts, the upper door being heavier than the lower door, and a sprocket and chain connection between said shafts, said lower door being adapted to be swung down against the driveway by contact therewith of a moving car, the upper door being swung upward simultaneously therewith; of anchors in said driveway, a pivoted latch in said lower door for engaging either one of said anchors, and air controlled means for releasing said latch in a short period after the car has passed over said lower door whereby the upper door swings down, by gravity, thereby swinging the lower door to a vertical position.

6. The combination with a doorway frame, shafts mounted respectively in the upper and lower ends of said frame and doors rigidly secured to said shafts, of sprocket and chain connections between said shafts, said lower door being adapted to be swung in either direction by engagement therewith of a moving vehicle, thereby to permit the vehicle to pass over said lower door, said upper door swinging simultaneously with the lower door and in a corresponding direction, a latch on said lower door, an anchor in the driveway in the radius of said lower door and adapted to engage said latch when the lower door is swung to its lowermost position, and a suction piston connected to said latch to allow said latch to be released from said anchor a short period of time after the vehicle has passed over the lower door, the upper door being heavier than the lower door.

7. The combination with a driveway, a shaft extending across the same and mounted in bearings, a shaft mounted above the first shaft, chain and sprocket connections between said shafts, and a door rigidly connected to each shaft, said upper door being heavier than the lower door, the lower door being adapted to be swung down and passed over by a moving vehicle; of anchors in the driveway within the radius of the path of the door and on opposite sides of the same, a double ended latch mounted in said door for engaging either of said anchors, a cylinder in said door, having an air inlet, a piston in said cylinder, a rod connecting said latch and said piston, the contact of the latch with the anchor exerting a sudden pull on said piston, thereby creating a vacuum in the cylinder by which the latch is snapped into engagement with the anchor, the weight of the upper door exerting a pull on the lower door and its piston, whereby air gradually enters in back of said piston to allow the latches to disengage.

8. The combination with upper and lower horizontally supported shafts, of doors rigidly secured to said shafts and meeting at an intermediate point between said shafts, the upper door being heavier than the lower door, a stub shaft supported in parallel relation to one of the door shafts and adjacent thereto, a chain and sprocket connection between the stub shaft and the other door shaft, and driving means connecting the stub shaft and the adjacent door shaft; whereby when one of the said doors is swung either inward or outward, the other door is swung simultaneously therewith.

9. The combination with upper and lower horizontally supported shafts, and doors rigidly secured to said shafts and meeting at an intermediate point between said shafts, the upper door being heavier than the lower door; of a stub shaft supported in parallel relation to one of the door shafts and adjacent thereto, gearing connecting the said stub shaft and the adjacent door shaft, a sprocket and chain connection between the stub shaft and the other door shaft whereby swinging movement of one door causes a corresponding movement of the other door shaft.

10. A car operated garage door, comprising an upper section hinged along its upper edge and a lower section hinged along its lower edge, motion transmitting means interconnecting the said sections for causing them to move in unison when one of them is moved about its hinge, mechanism operative upon movement of the sections from closed to open position to temporarily lock them in open position after a car has passed over the lower door and means operative to automatically move the sections to closing position when the lock is ineffective.

11. A car operated garage door, comprising an upper section hinged along its upper edge and a lower section hinged along its lower edge, motion transmitting means interconnecting the said sections for causing them to move in unison when one of them is moved about its hinge and mechanism operative upon movement of the sections from closed to open position to temporarily lock them in open position, said mechanism including means acted upon during the opening movement of the sections to exert a holding action which decreases after a car has passed over the lower door.

12. Apparatus according to claim 11 in which the said mechanism includes time-controlled self-releasing pneumatic means acted upon during the opening movement of the sections to exert a holding action which decreases after a car has passed over said lower section.

In testimony whereof I affix my signature.

HANS H. WOLFF.